Nov. 23, 1965     T. A. CHUBB     3,219,292
ORIENTATION CONTROLLER FOR SPACE VEHICLES
Filed July 28, 1961     2 Sheets-Sheet 2
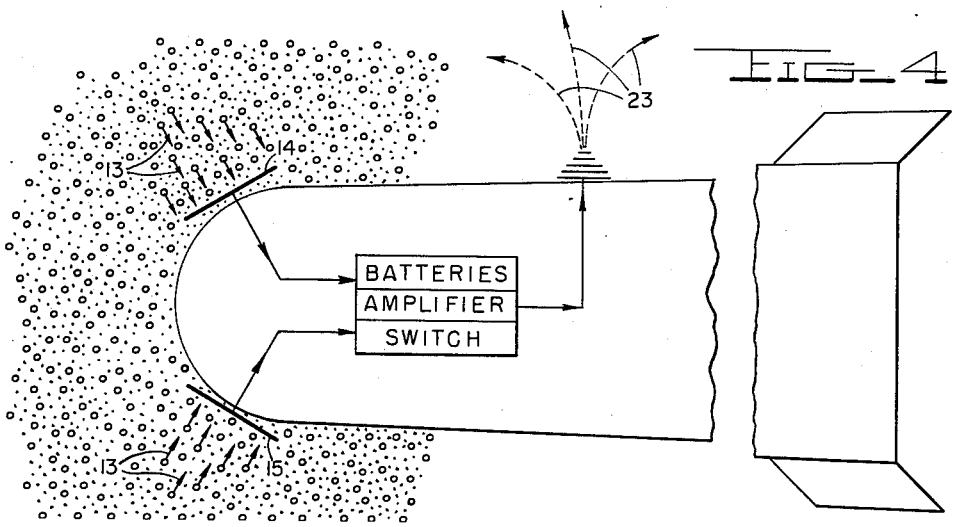
INVENTOR.
TALBOT A. CHUBB

United States Patent Office 3,219,292
Patented Nov. 23, 1965

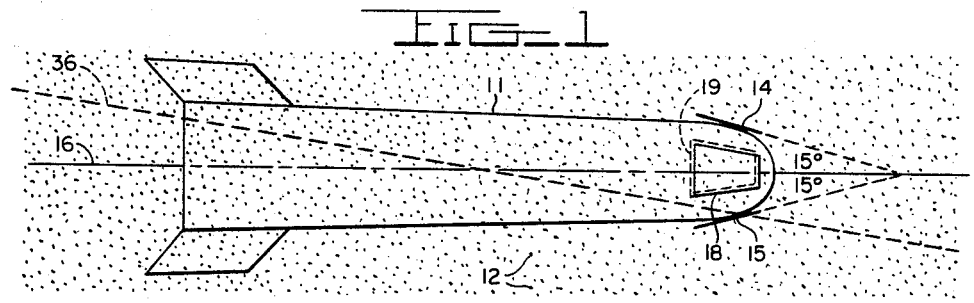
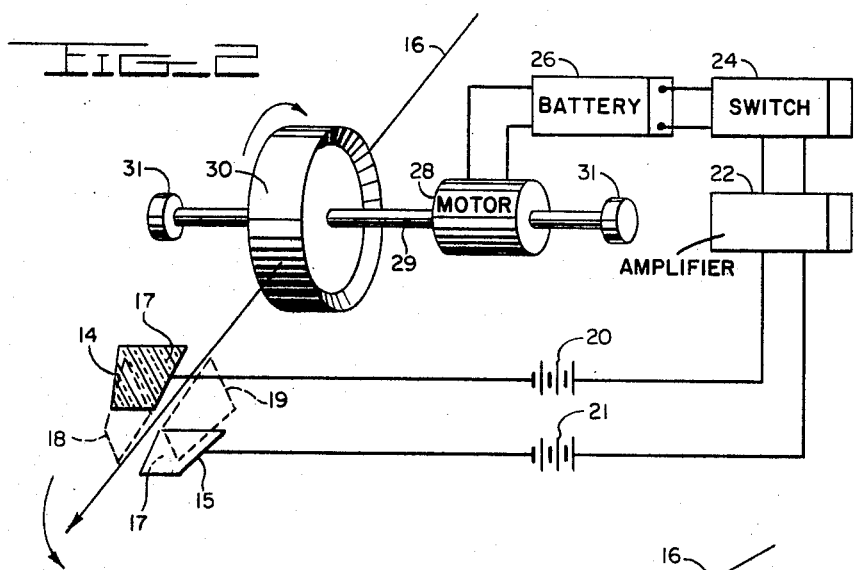
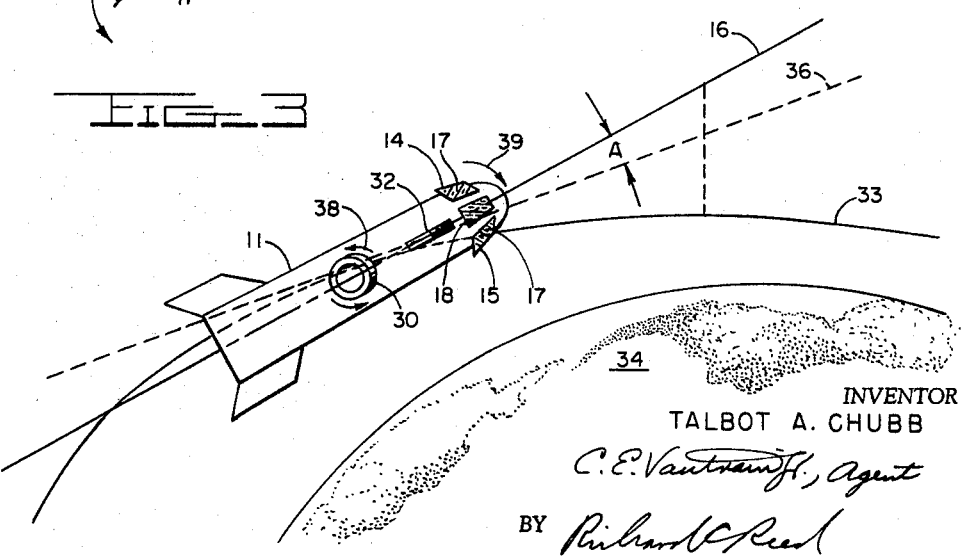
INVENTOR
TALBOT A. CHUBB

3,219,292
ORIENTATION CONTROLLER FOR
SPACE VEHICLES
Talbot A. Chubb, 207 Oneida Way, Washington, D.C.
Filed July 28, 1961, Ser. No. 127,746
8 Claims. (Cl. 244—1)
(Granted under Title 35, U.S. Code (1952), sec. 266)

The invention described herein may be manufactured and used by or for the Government of the United States of America for governmental purposes without the payment of any royalties thereon or therefor.

This invention relates in general to space vehicles or other objects traversing space and more particularly to a novel means for orienting the attitude of such vehicles or objects along their orbital paths.

The present invention contemplates that a space vehicle or other object traversing space is stabilized in attitude by means independent of the invention. The stabilization may be through operation of a device such as the inventor's rocket stabilizer, in an application for Letters Patent Serial Number 120,799, filed June 29 1961, now abandoned, or other device or devices which provide stability of attitude in an object traversing space.

When a space vehicle or other such object is stabilized about its yaw, pitch and roll axes it may nevertheless be limited in operation through inability to remain headed along its velocity path. Such inability can cause a space vehicle to be headed oppositely along its velocity path at points one-half an orbit apart, and in intermediate headings at intermediate points.

Where it is desired to accelerate or decelerate at a selected point along a velocity path, it is obvious that such acceleration or deceleration can best be carried out only at points when the space vehicle or object is headed in the direction of, or opposite to, its orbital motion. An example is in the case where recovery is to be made of a space vehicle or a component thereof. If deceleration is to occur at a selected point in orbit, the space vehicle or other object must be headed in such a direction that the force applied by means present in the vehicle will cause an amount and direction of decelerating force that will result in a predictable area for recovery of the vehicle or component.

In an electrically conductive plasma such as the ionosphere it is possible to obtain guidance of a space vehicle or other object along its velocity path without recourse to sensors such as a pitch gyro. This invention provides means by which a vehicle or other object traversing space may be maintained headed along its orbital path without the use of gyro or other sensor control.

Accordingly, it is an object of the present invention to provide novel means for orienting a space vehicle relative to its velocity vector.

It is a further object of this invention to provide means for orienting a space vehicle relative to its velocity vector wherein the longitudinal axis of the space vehicle is maintained tangent to the velocity vector in the direction of flight.

It is a still further object of the present invention to provide means for orienting a space vehicle relative to its velocity vector in which direction is obtained without the use of a stabilized platform.

It is a still further object of this invention to provide means for orienting a space vehicle relative to its velocity vector wherein guidance is obtained from the plasma through which the vehicle is traveling.

It is a still further object of the present invention to provide means for orienting a space vehicle relative to its velocity vector wherein corrective torques are applied without altering the angular momentum of the vehicles.

Other objects and advantages of the invention will be apparent from the following detailed description when taken in conjunction with the accompanying drawings which illustrate the embodiment of the invention and in which:

FIG. 1 is a schematic diagram of a space vehicle in an environment necessary for operation of the invention.

FIG. 2 is both a circuit diagram of the electrical components and a block diagram of the physical components of the invention.

FIG. 3 is a schematic diagram illustrating the operation of the invention; and

FIG. 4 is a circuit diagram of current flow between the space vehicle and its environment.

Referring now to FIG. 1, space vehicle 11 is shown traversing an electrically conductive plasma 12, such as the ionosphere. The plasma is characterized by a uniform density of positively charged particles, i.e. ions, sufficient to produce a measurable electric current flow to a conductive surface moving through it such as oppositely disposed pairs of collector plates 14, 15, 18 and 19 mounted on the exterior surface of the vehicles. Plates 18 and 19 are spaced 90° from plates 14 and 15 about centerline 16. Plate pairs 14 and 15 and 18 and 19 may be positioned at various angles with respect to the longitudinal centerline 16 of body 11 so long as they are symmetrically positioned therewith. An angle of 15° with centerline 16 was selected in the embodiment depicted and described herein. Plates 14, 15, 18 and 19 in addition may have various areas though, of course, each pair should be equal in area. In the illustrated embodiment, the plates each have an area of the order of one-ninth of a square foot. The plates further may be positioned symmetrically at any of a variety of points along the body or appendages of vehicle 11 or may be supported away from the body on retractable struts or other members extending from the body, the primary result to be achieved being to place the conductive plates in the most effective position with respect to the particles to be intercepted.

In FIG. 2 is shown a circuit and block diagram, partly schematic, of the components of the invention. Plates 14 and 15 only are described in detail, they are positioned with respect to centerline 16 as described above and shown by illustration in FIG. 1 and are connected to the negative terminals of batteries 20 and 21, respectively, as shown in FIG. 2, whereby the plates are biased at a selected potential, in the illustrated embodiment —15 volts, relative to the space vehicle skin. Plates 14 and 15 serve as collectors of positive ions and furnish currents to a prior art balanced electrometer-amplifier, or differential amplifier, 22 such as shown and described in an article "High-Speed Electrometers for Rocket and Satellite Experiments" by J. Praglin and W. A. Nichols published in Proceedings of the IRE, April 1960, pages 771–779. Since the electrometer-amplifier has two inputs, the circuit shown on page 776, FIG. 7a, is modified to include a second input, with the second input leading to the control grid of tube $V_2$–5886 and connected as shown on the circuit drawing for input number 1 leading to tube $V_1$–5886. Plates 18 and 19 are similarly connected to a separate battery or batteries. The plates in the illustrated embodiment are coated with a thin partially conducting film 17, shown in FIGS. 2 and 3, of evaporated lithium fluoride to reduce photoelectric emission produced by sunlight. It is apparent that the bias between plates and vehicle skin may be varied within relatively wide limits and that means other than the film specified to reduce emission may be used within the concept of the invention.

Balanced electrometer-amplifier, or differential amplifier, 22 is adjusted to provide a positive output voltage when the current from collector plate 15 exceeds the current from collector plate 14. The voltage from differential amplifier 22 is applied to switch 24 which connects battery 26 across torquing motor 28 causing counterclockwise rotation of shaft 29 and flywheel 30 in bearings 31. Shaft 29 is mounted perpendicular to centerline 16 and to a plane bisecting both collector plates, placing flywheel 30 partly within and parallel to the bisecting plane. The position of shaft 29 along centerline 16 is essentially arbitrary since center of gravity is not a factor in space vehicle attitude orientation and control. Flywheel 32, shown in FIG. 3, is mounted similarly with respect to centerline 16 and plates 18 and 19 as is flywheel 30 with respect to plates 14 and 15.

The curent flow between plasma 12 and vehicle 11 is indicated in FIG. 4 by arrows 13 which indicate ions attracted to the collector plates. These ions produce a potential difference between the plates, which are biased negatively by batteries 20 and 21 shown in FIG. 2, and the skin of the space vehicle. Since the plates and skin are connected at amplifier 22, a current flow is established from space ions through the collector plates and amplifier 22 to the skin and then back to space via space electrons, as indicated by arrows 23. The skin of vehicle 11 is indicated as at ground potential, and electron flow is considered the reverse of the current flow indicated by the arrows in FIG. 4.

Actually, positive ions and negative electrons in equal numbers end up on the vehicle. Part of the current from space is ion flow and part is electron flow, but the collector plates are biased to receive only ion flow.

Operation of the invention is now considered with reference to FIG. 3 in which space vehicle 11 is shown traversing orbit 33 about celestial body 34. The attitude of vehicle 11 is selected at a time shortly after it has assumed an orbit along path 33 and has been stabilized in attitude. At the position shown, longitudinal axis 16 is at an angle A with a line 36 tangent to orbit 33; the axis, line and orbit all being in a plane perpendicular to the surface of body 34 directly below vehicle 11. Line 36 is shown in FIG. 1 where it may be observed that since line 36, and lines parallel to it in the bisecting planes, represent the direction in which vehicle 11 was headed when it became stabilized there is a greater area of collector plate 15 exposed to the plasma than of collector plate 14.

Where collector plate 15 presents a greater surface to which ions may be attracted, it will develop a current which exceeds the current from collector plate 14—which latter plate is more nearly in line with the direction of movement of vehicle 11 at stabilization. The greater current from plate 15 causes a positive voltage to be applied to switch 24, actuating the switch and causing battery 26 to apply a voltage to energize torquing motor 28 into counterclockwise rotation. As may be noted in FIG. 3, counterclockwise rotation 38 of flywheel 30 will produce clockwise rotation 39 of vehicle 11 thereby depressing the nose of vehicle 11 toward body 34 until such time as the currents from collector plates 14 and 15 are equal or nearly equal. At such time there is insufficient current to actuate switch 24, and energy to torquing motor 28 is cut off.

Thus, as vehicle 11 orbits along path 33, collector plate 15 will successively present a greater surface to the conductive plasma. Such greater surface will cause counterclockwise rotation of flywheel 30 until resultant clockwise rotation of rocket 11 brings about an equalization of current from the plates. At equalization, vehicle 11 again will be headed or substantially headed in the direction of its velocity vector.

The orientation controller described with respect to plates 14 and 15 provides a device which maintains a space vehicle oriented parallel to its velocity vector provided its longitudinal axis remains parallel to the orbit plane. Where it is necessary to so maintain parallelism between the longitudinal axis and orbit plane, a second controller may be provided identical to that described and having plates 18 and 19 which are positioned 90° around the longitudinal axis from plates 14 and 15 and flywheel 32 whose shaft is similarly positioned 90° around the longitudinal axis from the position of shaft 29. The present invention includes the use of either the pitch axis orientation controller, i.e. plates 14 and 15, or the yaw axis orientation controller, i.e. plates 18 and 19, or both.

The operation of the second or yaw axis controller is similar to that of the controller described, and may be explained by considering that deviation of the heading of the space vehicle to the left or right of its orbit plane replaces the angle A referred to in the foregoing description of operation. Assuming a deviation to the left of its orbit plane, the illustration in FIG. 1 may be used to explain correction of this deviation by the device of the present invention. Plate 18 may be visualized as having been rotated into the position of plate 15 in FIG. 1. In this position, plate 18 presents a greater surface to which ions may be attracted and plate 19 a lesser, plate 19's surface being nearly parallel to the orbit plane represented by 36. The greater current from plate 18 will cause rotation of flywheel 32, shown in FIG. 3, in a counter-clockwise direction when viewed from above resulting in the nose of the vehicle being moved clockwise, also when viewed from above, until centerline 16 is parallel to or substantially parallel to the orbit plane.

There is thus presented a method and a system for maintaining the heading of an orbiting body along its velocity vector, or substantially along that vector, which makes it possible to apply preset forces at any time during orbit. This method of orienting a space vehicle to tangency with its velocity vector is particularly valuable when successive firings or stagings of a space vehicle are desired. Another example of use is in de-acceleration of a space vehicle for reentry.

It will be appreciated that many modifications and variations of the present invention are possible in the light of the above teachings. It is therefore to be understood that within the scope of the appended claims the invention may be practiced otherwise than as specifically described.

What is claimed is:

1. An orientation controller for maintaining a space vehicle, which is traversing an electrically conductive plasma, headed in the direction of its velocity vector comprising at least a pair of collecting means mounted on said vehicle for collecting charged particles while moving through said plasma, said means mounted such that current signals of unequal strength will be received therefrom when the heading of said vehicle is in a direction other than that of its velocity vector, and means in said vehicle for altering the heading thereof in response to the stronger of said current signals so as to rotate said vehicle until its heading is parallel to or substantially parallel to the direction of its velocity vector.

2. An orientation controller for maintaining a space vehicle, which is traversing an electrically conductive plasma, headed along its velocity vector comprising collecting means mounted on said vehicle for collecting charged particles from said plasma, said collecting means including at least a pair of collecting surfaces symmetrically positioned about said vehicle and inclined at an angle to the longitudinal axis thereof, electrical potential means connected to said surfaces for maintaining said surfaces at a selected negative potential, differentiating means connected to said electrical potential means for detecting a difference in current strength therefrom when said vehicle is headed in a direction other than along its velocity vector, and momentum means in said vehicle for applying momentum in response to said difference in current strength such that the heading of said vehicle is altered until the longitudinal axis thereof is substantially parallel to said velocity vector.

3. An orientation controller for maintaining a space vehicle, which is traversing an electrically conductive plasma, headed in the direction of or substantially in the direction of its velocity vector comprising, at least a pair of collecting surfaces mounted on said vehicle for collecting charged particles from said plasma, said surfaces positioned symmetrically about said vehicle and inclined to the longitudinal axis of said vehicle so as to present substantially identical areas for intercepting said particles when the vehicle is headed substantially in the direction of its velocity vector, means for maintaining said surfaces at a selected negative potential, said surfaces providing current signals of unequal strength when the vehicle is headed in a direction other than that of its velocity vector, amplifying means for amplifying the stronger of said unequal strength signals, and momentum transfer means in said vehicle for effecting alignment of the heading thereof with said velocity vector in response to said amplified signal.

4. An orientation controller for maintaining a space vehicle, which is traversing an electrically conductive plasma, headed along its velocity vector comprising collecting means mounted on said vehicle for collecting charged particles from said plasma, said collecting means including at least two pairs of oppositely disposed collecting surfaces symmetrically positioned about said vehicle with each collecting surface inclined at an angle to the longitudinal axis thereof, separate electrical potential means connected to each pair of said surfaces for maintaining each pair of said surfaces at a selected negative potential, differentiating means connected to said separate electrical potential means connected to each pair of said collecting surfaces for detecting a difference in current strength therefrom when said vehicle is headed in a direction other than along its velocity vector, and separate momentum means in said vehicle for applying momentum in response to said difference in current strength produced by each separate pair of collecting surfaces such that the heading of said vehicle when headed in a direction other than along its vector is altered until the longitudinal axis thereof is substantially parallel to said velocity vector, one of said pairs of surfaces positioned to correct heading deviation about the pitch axis of said vehicle and another of said pairs of surfaces positioned to correct heading deviation about the yaw axis of said vehicle.

5. An orientation controller for maintaining a space vehicle, which is traversing an electrically conductive plasma, headed along its velocity vector comprising collecting means mounted on said vehicle for collecting charged particles from said plasma, said collecting means including at least two pairs of oppositely disposed collecting surfaces symmetrically positioned about said vehicle with each of said collecting surfaces inclined at an angle to the longitudinal axis thereof, separate electrical potential means connected to each pair of said surfaces for maintaining said surfaces at a selected negative potential, separate differentiating means connected to said separate electrical potential means connected to each pair of collecting surfaces for detecting a difference in current strength therefrom when said vehicle is headed in a direction other than along its velocity vector, separate momentum means mounted in said vehicle for applying momentum in response to said difference in current strength produced by each separate pair of collecting surfaces such that the heading of said vehicle when headed in a direction other than along its velocity vector is altered until the longitudinal axis thereof is substantially parallel to said velocity vector, each of said separate momentum means including at least one balanced rotatable mass for each pair of surfaces, and separate rotating means for rotating said separate momentum means in a direction opposite to and coplanar with the corrective rotation to be applied to said vehicle when headed in a direction other than along its velocity vector in response to each respective current signal.

6. An orientation controller for maintaining an orbiting space vehicle, which is traversing an electrically conductive plasma, headed along its orbital path comprising charged particle collecting means connected to said space vehicle, said charged particle collecting means collecting charged particles during movement of said vehicle through said plasma and producing currents of equal valve during heading of said vehicle along a desired orbital path, said collecting means producing a current difference of increasing value corresponding to a deviation of said vehicle from its heading along a desired orbital path, vehicle heading corrective means in said vehicle responsive to said current difference of increasing value produced by said charged particle collecting means, said heading corrective means acting on said vehicle to return said vehicle to its desired orbital heading, whereby the current difference of said charged particle collecting means is decreased to currents of equal value wherein said vehicle is directed along its desired orbital path.

7. An orientation controller for maintaining an orbiting space vehicle, which is stabilized in attitude and traversing an electrically conductive plasma, headed along its orbital path comprising charged particle collecting means connected to said space vehicle, said charged particle collecting means collecting charged particles during movement of said vehicle through a plasma and producing currents of equal valve during heading of said vehicle along a desired orbital path, said charged particle collecting means producing a current difference of increasing value corresponding to a deviation of said vehicle from its heading along a desired orbital path, uniaxial vehicle heading corrective means within said vehicle responsive to said current difference of increasing value produced by said collecting means, said uniaxial heading corrective means acting upon said vehicle to return said vehicle to its desired orbital heading whereby the current difference of increased value is decreased to currents of equal value wherein said vehicle is directed along its desired path.

8. An orientation controller for maintaining an orbiting space vehicle, which is traversing an electrically conductive plasma, headed along its orbital path comprising charged particle collecting means connected to said space vehicle, said charged particle collecting means collecting charged particles during movement of said space vehicle through a plasma and producing currents of equal value during heading of said vehicle along a desired orbital path, said charged particle collecting means producing a current difference of increasing value corresponding to a deviation of said vehicle from its heading along a desired orbital path, vehicle heading corrective means within said vehicle responsive to said current difference of increasing value produced by said collecting means, said vehicle heading corrective means acting upon said vehicle to return said vehicle to its desired orbital heading whereby the current difference of increased value is decreased to currents of equal value wherein said vehicle is directed along its desired orbital path, and said vehicle heading corrective means including momentum means for applying corrective momentum in response to said current difference of increased value.

No references cited.

FERGUS S. MIDDLETON, *Primary Examiner.*

CHESTER L. JUSTUS, *Examiner.*